Patented Sept. 26, 1950

2,523,646

UNITED STATES PATENT OFFICE 2,523,646

COMPOSITION FOR THE CORRECTION OF SURFACE IRREGULARITIES AND METHOD OF PREPARING THE SAME

John W. Buchanan, New York, N. Y., assignor to National Gypsum Company, Buffalo, N. Y., a corporation of Delaware No Drawing. Application January 15, 1947, Serial No. 722,301

2 Claims. (Cl. 106—112)

This invention relates to a composition for the correction of surface irregularities, such as cracks, holes, dents, tool marks, rough grain, open joints, or other surface defects appearing on walls or the like, and also to a method of preparing such a composition.

The principal object of the present invention is to provide a powdered composition capable of being mixed with water to form a plastic mixture for filling surface depressions and which sets and hardens to produce a substantially non-sagging, non-shrinking and easily sanded finish which will take any paint or other decorative finish.

Another object is to provide such a composition which can be applied to any type of foundation surface, such as plaster, wood, brick, stone, metal, wallboard, and the like.

Another object is to provide such a composition which can be worked with ease to correct surface irregularities and which is strongly adherent to the foundation surface.

Another aim is to prepare such a composition in powder form by a dry mixing or blending process.

Another object is to provide such a composition which can be produced at low cost.

In the practice of the present invention, the composition can be prepared in powder form by a single dry mixing or blending step. All ingredients are thoroughly mixed or blended in any suitable equipment, such as a ribbon or paddle type mixer. If a higher degree of fineness than that of the ingredients employed is desired, ball or tube mills, as well as impact or swing hammer pulverizers can be utilized for further processing of the composition.

The following is a preferred example of a composition embodying the present invention, in which the proportions and specifications of the dry powdered ingredients are also indicated:

| Ingredients | Specification | Proportions (by weight) |
|---|---|---|
| Calcined Gypsum | 100% thru 100 mesh. 90% (Min.) thru 325 mesh. | 160 |
| Limestone Flour (fine ground calcium carbonate). | 100% thru 100 mesh. 90% (Min.) thru 325 mesh. | 200 |
| Aluminum Silicate Filler | 100% thru 100 mesh. 90% (Min.) thru 325 mesh. | 20 |
| Asbestine Clay (fibrous talc, magnesium silicate filler). | 100% thru 100 mesh. 90% (Min.) thru 325 mesh. | 20 |
| Hide Glue Dust | 100% thru 100 mesh. 90% minimum thru 200 mesh. | 16 |
| Potassium Sulfate | 95% minimum thru 100 mesh. | 1 |

In the above example, the gypsum employed is preferably the type known in the trade as terra alba, this being the purest white gypsum commercially available. In the practice of the invention, depending upon the type of composition desired, the fillers, in the above example, namely, calcium carbonate, aluminum silicate and asbestine clay, can be replaced in whole or in part with finely ground gypsum, and other types of fillers and accelerators other than potassium sulfate can be employed. The proportions of the ingredients and the particle size thereof can also be altered to achieve desired properties in the finished product. The invention is therefore not to be construed as limited to any specific ingredients, proportions or specific particle size except as specifically set forth in the accompanying claims.

From the foregoing it will be seen that the present invention provides a powdered composition which, with the addition of water, produces a plastic mixture for the repair of surface irregularities and which sets and hardens to produce a substantially non-sagging, non-shrinking and easily sanded finish which will take paint or other decorative finish. Further it will be seen that the composition is produced at low cost by a single step dry mixing process in which all of the ingredients in dry powdered form are blended to produce the desired composition.

I claim:

1. A dry, powdered composition for the correction of surface irregularities and adapted to be rendered plastic by the addition of water and harden upon drying without substantial sagging or shrinking, consisting essentially of about 160 parts by weight of dry particles of calcined gypsum all of which are capable of passing through a 100 mesh screen, about 240 parts by weight of dry particles of filler all of which are capable of passing through a 100 mesh screen, about 16 parts by weight of dry particles of hide glue all of which are capable of passing through a 100 mesh screen, and about 1 part by weight of dry particles of accelerator at least 95% of which are capable of passing through a 100 mesh screen, said particles being substantially separate and physically uncombined with one another and uniformly dispersed throughout said composition.

2. The method of preparing a dry, powdered composition for the correction of surface irregularities which composition is adapted to be rendered plastic by the addition of water and harden upon drying without substantial sagging or shrinking, said method consisting of the single step of dry blending the following materials consisting essentially of about 160 parts by weight of dry particles of calcined gypsum all of which are capable of passing through a 100 mesh screen, about 240 parts by weight of dry particles of filler all of which are capable of passing through a 100 mesh screen, about 16 parts by weight of dry particles of hide glue all of which are capable of passing through a 100 mesh screen, and about 1 part by weight of dry particles of accelerator at least 95% of which are capable of passing through a 100 mesh screen; whereby all of said particles are maintained substantially separate and physically uncombined with one another and are uniformly dispersed throughout said composition.

JOHN W. BUCHANAN.

REFERENCES CITED

The following references are of record in the file of this patent:

UNITED STATES PATENTS

| Number | Name | Date |
|---|---|---|
| 346,143 | Bronson | July 27, 1886 |
| 1,705,074 | Stahlhut | Mar. 12, 1929 |
| 1,858,369 | Linzell et al. | May 17, 1932 |
| 1,954,291 | Haire et al. | Apr. 10, 1934 |
| 2,322,930 | Gardner | June 29, 1943 |